United States Patent
Nishimoto et al.

(10) Patent No.: US 9,537,300 B2
(45) Date of Patent: Jan. 3, 2017

(54) LOAD DRIVING DEVICE

(71) Applicant: DENSO CORPORATION, Kariya, Aichi-pref. (JP)

(72) Inventors: Satoshi Nishimoto, Kariya (JP); Toru Itabashi, Anjo (JP); Yuki Mikami, Kariya (JP); Ryoichi Shiraishi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 14/479,396

(22) Filed: Sep. 8, 2014

(65) Prior Publication Data

US 2015/0085410 A1 Mar. 26, 2015

(30) Foreign Application Priority Data

Sep. 26, 2013 (JP) .................................. 2013-200079
May 12, 2014 (JP) .................................. 2014-098964

(51) Int. Cl.
*H02H 3/02* (2006.01)
*H02H 3/08* (2006.01)

(52) U.S. Cl.
CPC ........ *H02H 3/08* (2013.01); *H02H 3/02* (2013.01)

(58) Field of Classification Search
CPC ............ H02H 3/023; H02H 3/025; H02H 3/08
USPC ............................................................ 361/55
See application file for complete search history.

(56) References Cited

U.S. PATENT DOCUMENTS

| 5,647,387 | A | * | 7/1997 | Tsutsui | ................. H01H 47/325 137/1 |
|---|---|---|---|---|---|
| 2003/0043521 | A1 | | 3/2003 | Thiele | |
| 2008/0067154 | A1 | * | 3/2008 | Yamada | .................. B23H 7/20 219/69.13 |
| 2012/0075761 | A1 | * | 3/2012 | Miura | ..................... H02M 1/32 361/93.1 |
| 2012/0200970 | A1 | | 8/2012 | Itabashi et al. | |

FOREIGN PATENT DOCUMENTS

| JP | H02-222040 | A |   | 9/1990 |
|---|---|---|---|---|
| JP | 2005261059 | A | * | 9/2005 |
| JP | 2007-311467 | A |   | 11/2007 |
| JP | 2013-221484 | A |   | 10/2013 |

OTHER PUBLICATIONS

Japanese Office Action issued on Dec. 15, 2015 in the corresponding JP application No. 2014-098964. (English translation attached).

* cited by examiner

*Primary Examiner* — Ann Hoang
(74) *Attorney, Agent, or Firm* — Posz Law Group, PLC

(57) ABSTRACT

A load driving device includes a driving switching element, an interrupting part, a short-circuiting switching element, and a protecting element. The driving switching element drives a load by controlling energization to the load. The interrupting part is disposed on an energizing path to the load. The interrupting part is not melted by a driving current to the load and is melted by an interrupting current larger than the driving current so as to interrupt energization to the load. The short-circuiting switching element is connected in parallel with the load and applies the interrupting current to the interrupting part. The protecting element protects the short-circuiting switching element.

5 Claims, 7 Drawing Sheets

LOAD DRIVING DEVICE

CROSS REFERENCE TO RELATED APPLICATIONS

The present application is based on and claims priority to Japanese Patent Application No. 2013-200079 filed on Sep. 26, 2013 and Japanese Patent Application No. 2014-98964 filed on May 12, 2014, the contents of which are incorporated in their entirety herein by reference.

TECHNICAL FIELD

The present disclosure relates to a load driving device for driving a load.

BACKGROUND

As an example of a load driving device, a circuit which is described as a third conventional example in JP-A-H02-222040 is known. The circuit according to the third example is connected between a microcomputer, and a load and a ground. The circuit includes an nMOS that performs switching control of power supply application to the load and a relay that is disposed on an energizing path to the load. When an abnormality is detected, the circuit turns off the relay to stop energization to the load.

Because the relay, which stops energization to the load when an abnormality occurs, is disposed on the energizing path to the load, an electric current same as an electric current flowing into a nMOS, which drives the load in a normal operation, flows into the relay. Thus, the above-described circuit needs a relay that has a rating of the same degree as the nMOS.

SUMMARY

It is an object of the present disclosure to provide a load driving apparatus that can interrupt energization to a load without using an element having a rating of the same degree as a switching element for driving a load.

A load driving device according to an aspect of the present disclosure includes a driving switching element, an interrupting part, a short-circuiting switching element, and a protecting element. The driving switching element drives a load by controlling energization to the load. The interrupting part is disposed on an energizing path to the load. The interrupting part is not melted by a driving current to the load and is melted by an interrupting current larger than the driving current so as to interrupt energization to the load. The short-circuiting switching element is connected in parallel with the load and applies the interrupting current to the interrupting part. The protecting element protects the short-circuiting switching element.

The load driving device can interrupt energization to the load by applying the interrupting current to the interrupting part and melting the interrupting part. In addition, the load driving device does not need an element having a rating of the same degree as the driving switching element as the short-circuiting switching element.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

First Embodiment

An injector driving device 100 according to a first embodiment of the present disclosure will be described with reference to FIG. 1 through FIG. 4. In the present embodiment, a load driving device according to the present disclosure is applied to the injector driving device 100 that drives an injector 200 as a load. However, the load driving device according to the present disclosure is not limited to the injector driving device 100 and may be any device that drives at least one load.

Figure 1:
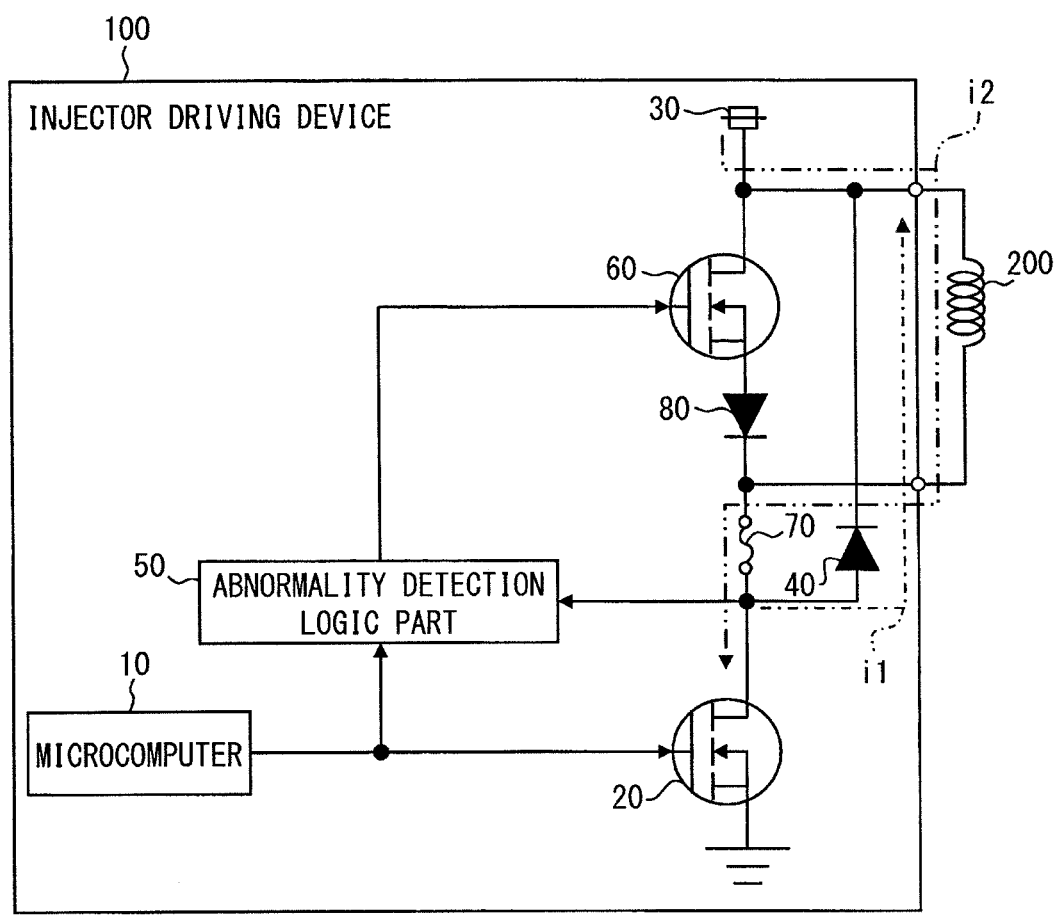
FIG. 1 is block diagram illustrating an injector driving device according to a first embodiment of the present disclosure.

Firstly, a configuration of the injector driving device 100 will be described with reference to FIG. 1. The injector driving device 100 is electrically connected with the injector 200. The injector driving device 100 drives the injector 200 by controlling energization to the injector 200. Because the injector 200 is a known injector, a description about the injector 200 will be omitted.

The injector driving device 100 includes a driving MOS 20, a short-circuiting MOS 60, and an interrupting part 70. The injector driving device 100 may further include a microcomputer 10, a power source 30, a free wheel diode 40, an abnormality detection logic part 50, a backflow preventing diode 80. The driving MOS 20, the short-circuiting MOS 60, and the interrupting part 70 are connected between the power source 30 and the ground. The backflow preventing diode 80 is an example of a protecting element.

The microcomputer 10 is a computer including an arithmetic unit, a memory, and an input/output part. The microcomputer 10 controls the driving MOS 20 by transmitting a driving signal based on a sensor signal and the like acquired via the input/output part. Specifically, the microcomputer 10 is electrically connected with a gate of the driving MOS 20. The microcomputer 10 transmits an on-signal and an off-signal to the driving MOS 20 so as to turn on and off the driving MOS 20.

The driving MOS 20 is an example of a driving switching element. The driving MOS 20 drives the injector 200 by controlling energization to the injector 200. The gate of the driving MOS 20 is electrically connected with the microcomputer 10, a drain of the driving MOS 20 is electrically connected with one terminal of the interrupting part 70, and a source of the driving MOS 20 is electrically connected with the ground. In addition, the drain of the driving MOS 20 is electrically connected with the injector 200 and a cathode of the backflow preventing diode 80 via the interrupting part 70. The injector 200 is connected in parallel with the short-circuiting MOS 60 and the backflow preventing diode 80 to form a parallel circuit, and the driving MOS 20 is connected in series with the parallel circuit. The driving MOS 20 is turned on when the on-signal is transmitted from the microcomputer 10, and the driving MOS 20 is turned off when the off-signal is transmitted from the microcomputer 10. Accordingly, energization to the injector 200 is controlled.

The power source 30 supplies power to the injector 200 and is electrically connected with the other terminal of the injector 200. The power source 30 is also electrically connected with the drain of the short-circuiting MOS 60. The other terminal of the injector 200 is different from the terminal of the injector 200 electrically connected with the interrupting part 70.

The free wheel diode 40 causes backflow of electric current that flows into the injector 200 when the driving MOS 20 is off. Specifically, a cathode of the free wheel diode 40 is electrically connected to a path that electrically connects the power source 30 and the injector 200. An anode of the free wheel diode 40 is electrically connected to a path that electrically connects the interrupting part 70 and the drain of the driving MOS 20. Due to the free wheel diode 40, when the driving MOS 20 is off, electric current flows through a path illustrated by a dashed-dotted line i1 in FIG. 1. On the other hand, when an abnormality does not occur and the driving MOS 20 is on, electric current flows through a path illustrated by dashed-two dotted line i2 in FIG. 1. The electric current flowing into the injector 200 is also called "load current".

The abnormality detection logic part 50 is an example of a controller. The abnormality detection logic part 50 is electrically connected to the path that electrically connects the drain of the driving MOS 20 and the injector 200 and the path that electrically connects the microcomputer 10 and the gate of the driving MOS 20.

The abnormality detection logic part 50 detects an abnormality based on an output voltage of the driving MOS 20 and the driving signal to the driving MOS 20. For example, the abnormality detection logic part 50 monitors the energizing current to the driving MOS 20 and monitors whether the driving signal to the driving MOS 20 is an off-signal or not. In other words, the abnormality detection logic part 50 monitors the energizing current to the driving MOS 20 and monitors whether there is an off-instruction to the driving MOS 20. When the driving signal is the off-signal and electric current flows to the driving MOS 20, the abnormality detection logic part 50 determines that an abnormality occurs. The abnormality detection logic part 50 compares the output voltage of the driving MOS 20 and a threshold value stored in a memory, which is not illustrated. Then, when the output voltage of the driving MOS 20 does not reach the threshold value, the abnormality detection logic part 50 determines that electric current flows into the driving MOS 20. The threshold value is used for determining a short circuit to ground.

Furthermore, the abnormality detection logic part 50 is electrically connected with a gate of the short-circuiting MOS 60. The abnormality detection logic part 50 controls the short-circuiting MOS 60 based on the above-described detection result. Specifically, the abnormality detection logic part 50 transmits a driving signal based on the detection result to control the short-circuiting MOS 60. In other words, based on the detection result, the abnormality detection logic part 50 transmits an on-signal and an off-signal to the short-circuiting MOS 60 so as to turn on and off the short-circuiting MOS 60. The abnormality detection logic part 50 transmits the on-signal to the short-circuiting MOS 60 when the abnormality detection logic part 50 detects that an abnormality occurs.

The abnormality detection logic part 50 may have other configuration. The abnormality detection logic part 50 only has to detect an abnormality of at least one of the energizing path to the injector 200 and the driving MOS 20, controls the short-circuiting MOS 60 based on the detection result, and transmits the on-signal to the short-circuiting MOS 60 when the abnormality detection logic part 50 detects that an abnormality occurs.

The short-circuiting MOS 60 is an example of a short-circuiting switching element. The short-circuiting MOS 60 is connected in parallel with the injector 200. Thus, both terminals of the injector 200 are short-circuited when the short-circuiting MOS 60 is turned on. In other words, the short-circuiting MOS 60 is a switching element for short-circuiting the both terminals of the injector 200.

The short-circuiting MOS 60 is also a switching element for applying an interrupting current to the interrupting part 70. The short-circuiting MOS 60 is connected between the power source 30 and the driving MOS 20. A drain of the short-circuiting MOS 60 is electrically connected with the power source 30 and a positive terminal of the injector 200. A source of the short-circuiting MOS 60 is electrically connected with an anode of the backflow preventing diode 80 and a negative terminal of the injector 200.

The interrupting current is larger than the driving current to the injector 200. The driving current is an electric current for driving the injector 200 and is not large enough to melt the interrupting part 70. The interrupting current is large enough to melt the interrupting part 70.

The short-circuiting MOS 60 is off when the abnormality detection logic part 50 does not detect that an abnormality occurs. The short-circuiting MOS 60 is turned on by the abnormality detection logic part 50 when the abnormality detection logic part 50 detects that an abnormality occurs.

As described above, the both terminals of the injector 200 is short-circuited when the short-circuiting MOS 60 is turned on. Accordingly, electric current flows from the power source 30 to the driving MOS 20 via the short-circuiting MOS 60, the backflow preventing diode 80, and the interrupting part 70. In other words, when the short-circuiting MOS 60 is on, the energizing path is formed such that electric current flows from the power source 30 to the driving MOS 20 via the short-circuiting MOS 60, the backflow preventing diode 80, and the interrupting part 70. A resistance component of the energizing path is smaller than a resistance component of the injector 200. Thus, the interrupting current flows to the interrupting part 70 when the short-circuiting MOS 60 is on.

The interrupting part 70 is disposed on the energizing path to the injector 200. In the present embodiment, the interrupting part 70 is connected between the injector 200 and the driving MOS 20. When an abnormality occurs, the interrupting current flows to the interrupting part 70. When an abnormality does not occur, the driving current flows to the interrupting part 70. The interrupting part 70 is not melted by the driving current. However, the interrupting part 70 is melted by the interrupting current, thereby interrupting energization to the injector 200. In other words, the interrupting part 70 is so called fuse.

In this way, the abnormality detection logic part 50, the short-circuiting MOS 60, and the interrupting part 70 achieve a fail-safe function to stop energization to the injector 200 when an abnormality occurs. Thus, the injector driving device 100 has the fail-safe function.

The backflow preventing diode 80 is connected between the short-circuiting MOS 60 and the driving MOS 20. The backflow preventing diode 80 prevents backflow of electric current via the short-circuiting MOS 60 when the driving MOS 20 is off. Specifically, the anode of the backflow preventing diode 80 is connected with the source of the short-circuiting MOS 60. A cathode of the backflow preventing diode 80 is connected with the other terminal of the interrupting part 70. The other terminal of the interrupting part 70 is a terminal different from the terminal of the interrupting part 70 connected with the drain of the driving MOS 20.

Next, a processing operation of the injector driving device 100 will be described with reference to FIG. 2 through FIG. 4. In an initial state of power supply to the injector driving device 100, the abnormality detection logic part 50 transmits the off-signal as the driving signal as illustrated from time t1 to time t2 in FIG. 3 and from time t5 to time t6 in FIG. 4. Thus, the short-circuiting MOS 60 is in an off-state. As illustrated from time t1 to time t4 in FIG. 3, in a case where the driving MOS 20 does not have an on-failure, the off-signal is transmitted, and the short-circuiting MOS 60 keeps the off-state.

Figure 3:
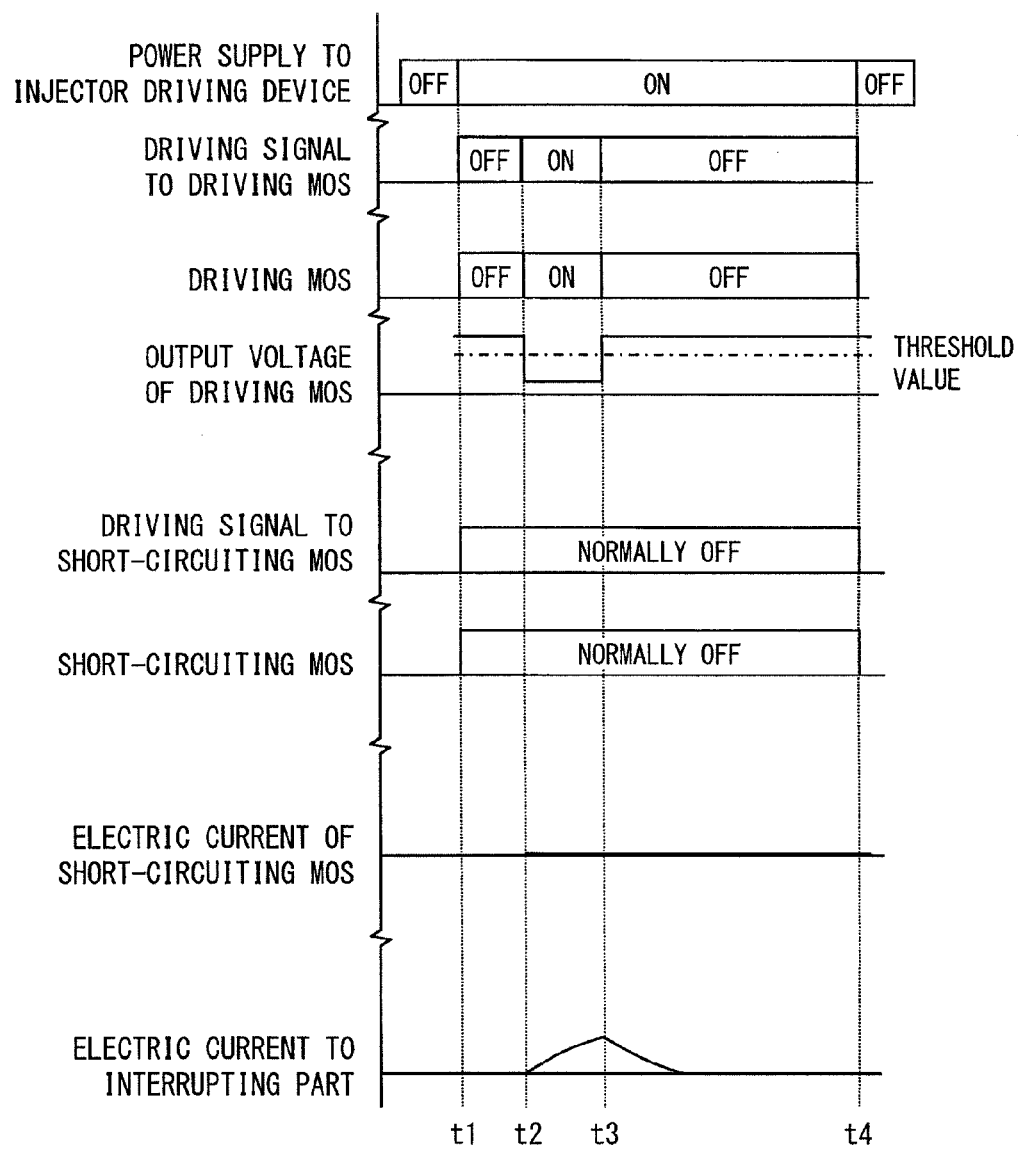
FIG. 3 is a timing diagram illustrating a processing operation performed by the injector driving device according to the first embodiment in a normal operation.
Figure 4:
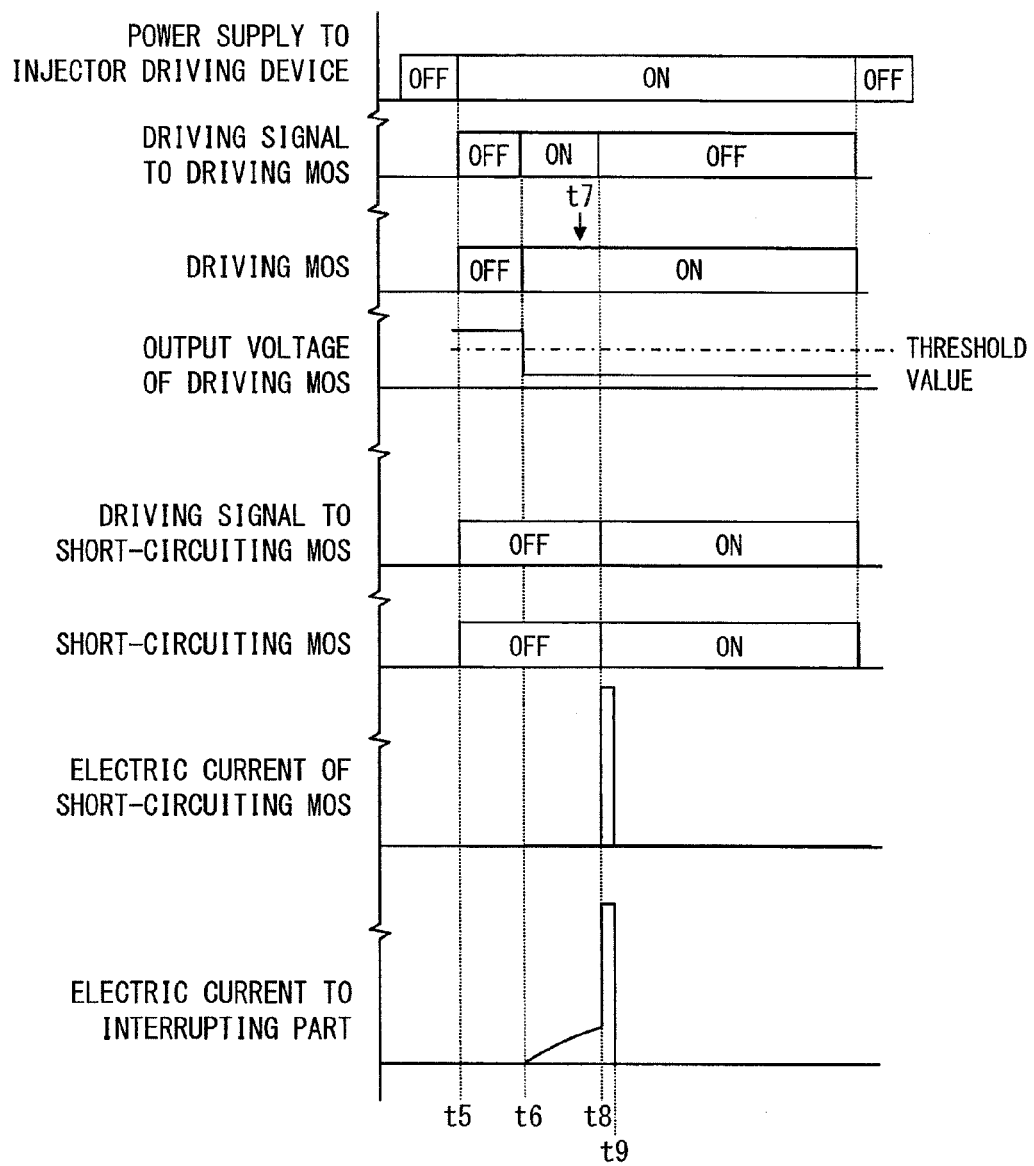
FIG. 4 is a timing diagram illustrating a processing operation performed by the injector driving device according to the first embodiment when an abnormality occurs.

When power is supplied to the injector 200, the microcomputer 10 transmits the on-signal as the driving signal to the driving MOS 20 as illustrated at time t2 in FIG. 3 and time t6 in FIG. 4. The driving MOS 20 is turned on based on the on-signal. Then, the output voltage of the driving MOS 20 decreases to the ground level as illustrated from time t2 to time t3 in FIG. 3 and from time t6 to time t8 in FIG. 4. At this time, the driving current flows to the interrupting part 70.

In contrast, when the energization to injector 200 is stopped, the microcomputer 10 transmits the off-signal as the driving signal to the driving MOS 20 as illustrated at time t3 in FIG. 3. The driving MOS 20 is turned off based on the off signal as illustrated at time t3 in FIG. 3. At this time, the output voltage of the driving MOS 20 increases to the power source level as illustrated from time t3 to time t4 in FIG. 3. In this way, the driving MOS 20 is turned on or off based on the driving signal transmitted from the microcomputer 10.

However, in the injector driving device 100, an on-failure may occur at the driving MOS 20 as illustrated at time t7 in FIG. 4. When an on-failure occurs at the driving MOS 20, as illustrated at time t8 or later in FIG. 4, the driving MOS 20 becomes an on-state although the off-signal is transmitted to the driving MOS 20.

Figure 2:
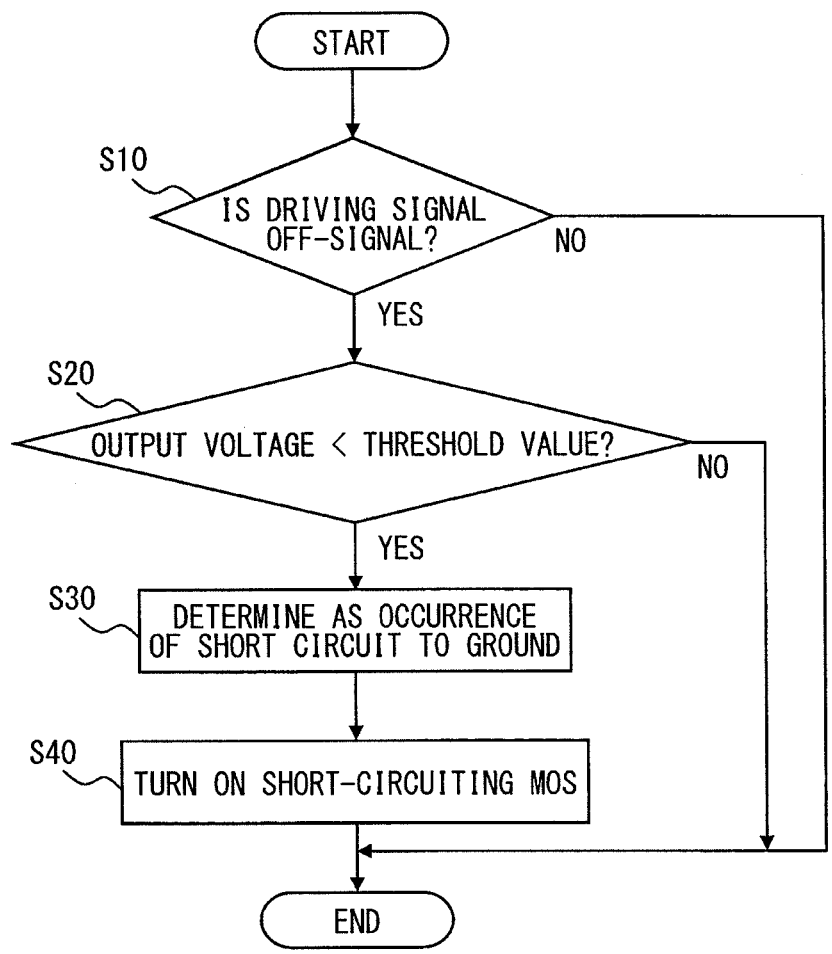
FIG. 2 is a flowchart illustrating a processing operation performed by the injector driving device according to the first embodiment.

Thus, when power supply to the injector driving device 100 starts, the injector driving device 100 starts a process illustrated by a flowchart in FIG. 2. The injector driving device 100 executes the process illustrated by the flowchart in FIG. 2 until the power supply to the injector driving device 100 stops. The flowchart in FIG. 2 illustrates a process for determining whether a short circuit to ground occurs due to an on-failure of the driving MOS 20. In other words, the flowchart in FIG. 2 illustrates a process for determining whether an abnormality occurs in the energizing path to the injector 200.

At S10, the abnormality detection logic part 50 determines whether the driving signal is the off-signal. At this time, the abnormality detection logic part 50 monitors the driving signal to the driving MOS 20 and determines the driving signal is the off-signal. When the abnormality detection logic part 50 determines that the driving signal is the off-signal, the abnormality detection logic part 50 proceeds to S20 to determine whether the driving MOS 20 has an on-failure. On the other hand, when the abnormality detection logic part 50 determines that the driving signal is the on-signal, the abnormality detection logic part 50 does not determine whether the driving MOS 20 has an on-failure. Thus, when the abnormality detection logic part 50 determines that the driving signal is the on-signal, the flowchart in FIG. 2 ends.

At S20, the abnormality detection logic part 50 determines whether the output voltage is less than the threshold value. When the abnormality detection logic part 50 determines that the output voltage is less than the threshold value, the abnormality detection logic part 50 considers that electric current flows into the driving MOS 20 and proceeds to S30. In contrast, when the abnormality detection logic part 50 determines that the output voltage is not less than the threshold voltage, the abnormality detection logic part 50 considers that electric current does not flow into the driving MOS 20 and the flowchart in FIG. 2 ends.

At S30, the abnormality detection logic part 50 determines that a short circuit to ground occurs. In a case where the driving MOS 20 does not have an on-failure, when an off-signal is transmitted to the driving MOS 20, the output voltage of the driving MOS 20 increases to the power source level. Thus, at S20, the abnormality detection logic part 50 determines that the output voltage is not less than the threshold value. In other words, the abnormality detection logic part 50 determines that the driving MOS 20 does not have an on-failure by determining that the output voltage is not less than the threshold value at S20.

However, in a case where the driving MOS 20 has an on-failure, as illustrated at time t8 or later in FIG. 4, even if the off-signal is transmitted to the driving MOS 20, the output voltage of the driving MOS 20 becomes the ground level. In other words, the output voltage of the driving MOS 20 becomes less than the threshold value. At this time, energization to the driving MOS 20 continues. Thus, the abnormality detection logic part 50 determines that the output voltage is less than the threshold value at S20. Therefore, the abnormality detection logic part 50 can determine that a short circuit to ground occurs when the off-signal is transmitted to the driving MOS 20 and the output voltage of the driving MOS 20 does not reach the threshold value. In other words, the abnormality detection logic part 50 determines that an abnormality occurs in the energizing path to the injector 200.

At S40, the abnormality detection logic part 50 turns on the short-circuiting MOS 60. Specifically, when the abnormality detection logic part 50 determines that a short circuit to ground occurs at S30, the abnormality detection logic part 50 transmits the on-signal to the short-circuiting MOS 60 as illustrated from time t8 to time t9 in FIG. 4. Accordingly, the abnormality detection logic part 50 turns on the short-circuiting MOS 60.

The short-circuiting MOS 60 is turned on based on the on-signal transmitted from the abnormality detection logic part 50 as illustrated from time t8 to time t9 in FIG. 4. Accordingly, the both terminals of the injector 200 are short-circuited. In addition, the interrupting current flows to the interrupting part 70 as illustrated from time t8 to time t9 in FIG. 4. In this way, the injector driving device 100 stops energization to the injector 200.

As described above, the injector driving device 100 includes the short-circuiting MOS 60 that applies the interrupting current to the interrupting part 70. Thus, by applying the interrupting current to the interrupting part 70, the injector driving device 100 can melt the interrupting part 70 and interrupts energization to the injector 200. In addition, the short-circuiting MOS 60 is connected in parallel with the injector 200. Thus, the driving current does not flow to the short-circuiting MOS 60. Thus, as the short-circuiting MOS 60, the injector driving device 100 does not need an element having a rating of the same degree as the driving MOS 20.

In addition, the injector driving device 100 turns on the short-circuiting MOS 60 when the injector driving device 100 determines that a short circuit to ground occurs. Thus, the injector driving device 100 interrupts energization to the injector 200 only when the injector driving device 100 determines that a ground short-circuit occurs.

In other words, the injector driving device 100 turns on the short-circuiting MOS 60 only when an abnormality occurs. Thus, when the injector driving device 100 drives the injector 200, the injector driving device 100 does not need to consider heat generated by the short-circuiting MOS 60. Thus, as the short-circuiting MOS 60, an element cheaper than the driving MOS 20 can be used. Thus, compared with a case where an element having a rating of the same degree as the driving MOS 20 is used as the short-circuiting MOS 60, the injector driving device 100 can achieve cost reduction.

The injector driving device 100 may also control a plurality of load systems including the injector 200. In this case, the injector driving device 100 drives a plurality of injectors 200. Thus, the injector driving device 100 includes a plurality of driving MOSs 20 respectively corresponding to the injectors 200. There may be a case where only a part of the driving MOSs 20 has an on-failure.

In this case, the injector driving device 100 can achieve evacuation traveling using the injectors 200 driven by the driving MOSs 20 without an on-failure while stopping energization to the injector 200 driven by the driving MOS 20 having an on-failure. In other words, the injector driving device 100 can stop the load system that cannot operate normally because of an on-failure at the driving MOS 20, and can achieve evacuation traveling using the load systems that can operate normally. In other words, the injector driving device 100 stops energization to the injector 200 driven by the driving MOS 20 having an on-failure in order to achieve evacuation traveling using the injectors 200 driven the driving MOSs 20 in the normal operation.

Second Embodiment

Figure 5:
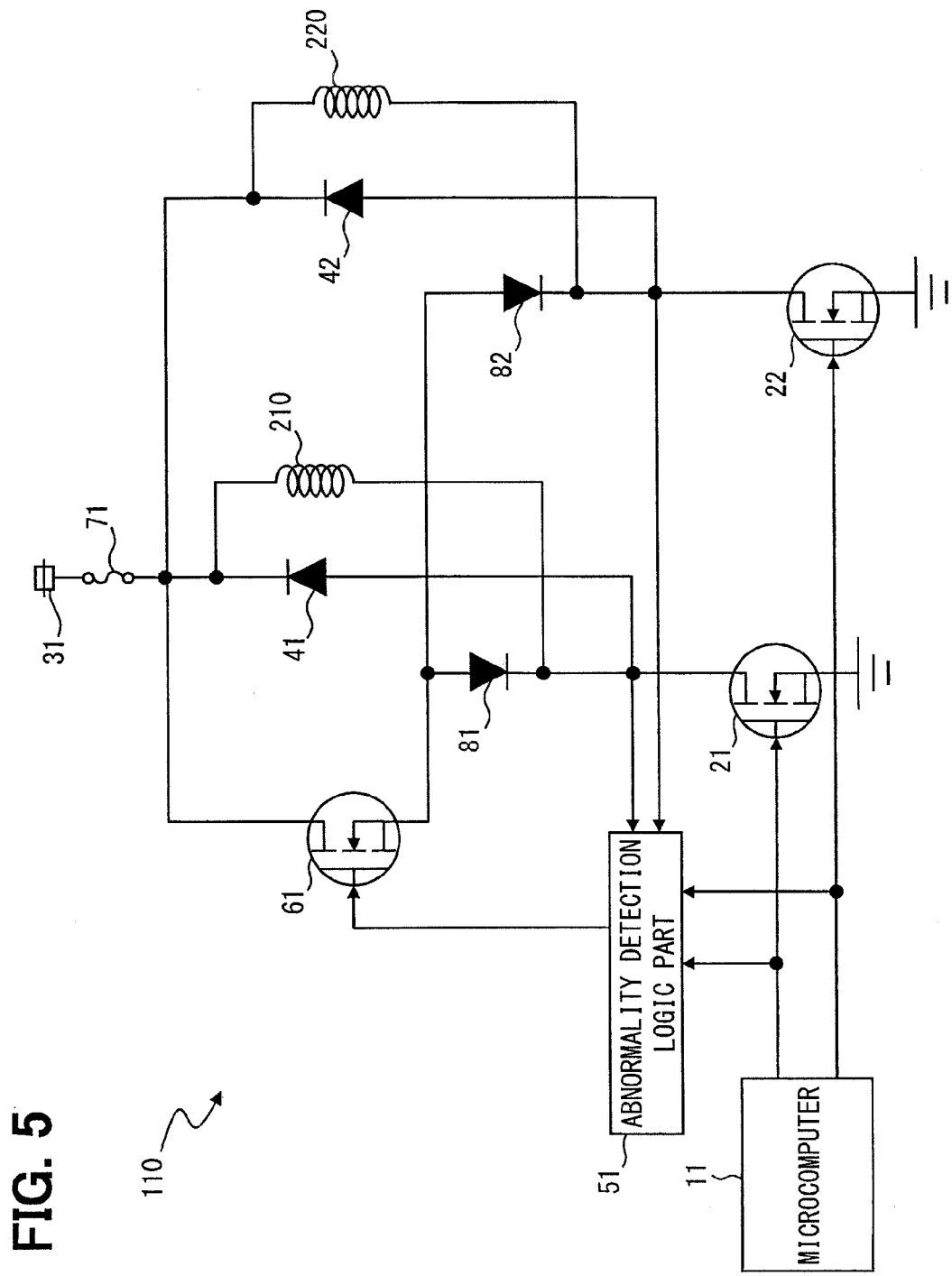
FIG. 5 is a block diagram illustrating an injector driving device according to a second embodiment of the present disclosure.

An injector driving device 110 according to a second embodiment of the present disclosure will be described with reference to FIG. 5 through FIG. 7. The injector driving device 110 drives a plurality of injectors as loads. Specifically, the injector driving device 110 drives a first injector 210 and a second injector 220.

The injector driving device 110 includes a first driving MOS 21, a second driving MOS 22, a short-circuiting MOS 61, and an interrupting part 71. In addition, the injector driving device 100 includes a microcomputer 11, a power source 31, a first free wheel diode 41, a second free wheel diode 42, an abnormality detection logic part 51, a first backflow preventing diode 81, and a second backflow preventing diode 82. Because the above-described components are similar to the components in the first embodiment, the description about similar points is omitted. The first back-flow preventing diode 81 and the second backflow preventing diode 82 are examples of a preventing element.

In the above-described components, the microcomputer 11, the power source 31, the abnormality detection logic part 51, the short-circuiting MOS 61, and the interrupting part 71 are provided for both of the first injector 210 and the second injector 220.

The other components are provided for each of the first injector 210 and the second injector 220. In other words, the first driving MOS 21, the first free wheel diode 41, and the first backflow preventing diode 81 are provided for the first injector 210. The second driving MOS 22, the second free wheel diode 42, and the second backflow preventing diode 82 are provided for the second injector 220. In this way, the backflow preventing diodes are provided as many as the injectors. In other words, the number of the backflow preventing diodes (the first backflow preventing diode 81 and the second backflow preventing diode 82) are same as the number of injectors (the first injector 210 and the second injector 220). The first backflow preventing diode 81 and the second backflow preventing diode 82 are provided to have same effects as the backflow preventing diode 80.

The short-circuiting MOS 61 is provided for both of the first injector 210 and the second injector 220. The short-circuiting MOS 61 is connected in parallel with each of the first injector 210 and the second injector 220. A source of the short-circuiting MOS 61 is electrically connected with a drain of the first driving MOS 21 via the first backflow preventing diode 81. The source of the short-circuiting MOS 61 is also electrically connected with a drain of the second driving MOS 22 via the second backflow preventing diode 82. A drain of the short-circuiting MOS 61 is electrically connected with the power source 31 via the interrupting part 71.

The interrupting part 71 is provided for both of the first injector 210 and the second injector 220. One terminal of the interrupting part 71 is electrically connected with the power source 31 and the other terminal is electrically connected with positive terminals of the first injector 210 and the second injector 220.

Figure 6:
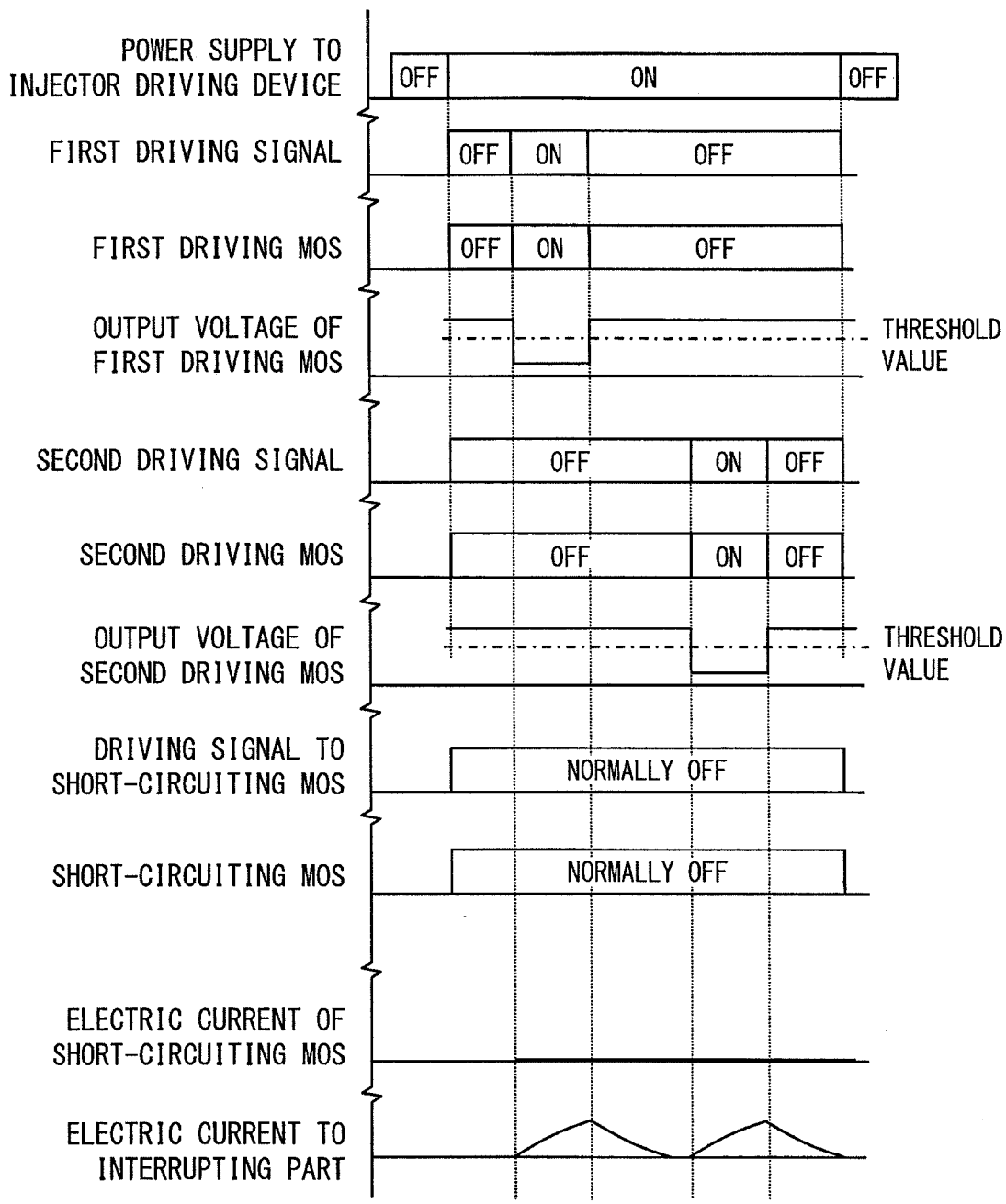
FIG. 6 is a timing diagram illustrating a processing operation performed by the injector driving device according to the second embodiment in a normal operation.

In a case where the first driving MOS 21 and the second driving MOS 22 do not have an on-failure, the injector driving device 110 operates as illustrated in the timing diagram in FIG. 6. In contrast, in a case where the second driving MOS 22 does not have an on-failure and the first driving MOS 21 has an on-failure, the injector driving device 110 operates as illustrated in the timing diagram in FIG. 7. In the injector driving device 110, an on-failure occurs at the first driving MOS 21 at time t10 in FIG. 7.

In this case, when the second driving MOS 22 receives an off-signal as a second driving signal from the microcomputer 11, the second driving MOS 22 is turned off based on the off-signal. However, even if the first driving MOS 21 receives an off-signal as a first driving signal from the microcomputer 11, the first driving MOS 21 remains on without being turned off.

Figure 7:
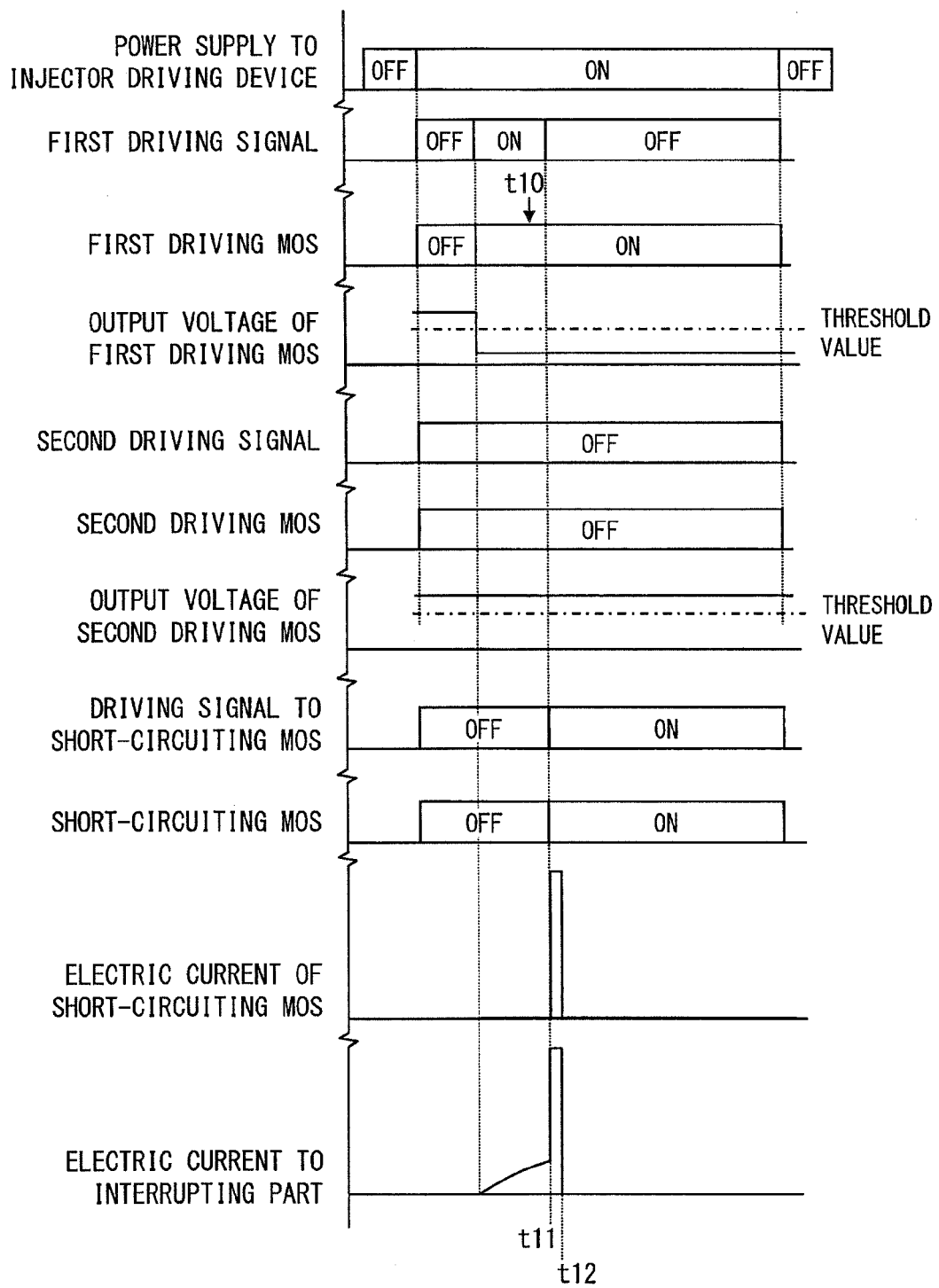
FIG. 7 is a timing diagram illustrating a processing operation performed by the injector driving device according to the second embodiment when an abnormality occurs.

Then, at time t11 in FIG. 7, the abnormality detection logic part 51 determines that a short circuit to ground occurs. Then, the abnormality detection logic part 51 transmits an on-signal to the short-circuiting MOS 61 as illustrated at time t11 or later in FIG. 7. Accordingly, the abnormality detection logic part 51 turns on the short-circuiting MOS 61.

The short-circuiting MOS 61 is turned on based on the on-signal from the abnormality detection logic part 51 as illustrated at time t11 or later in FIG. 7. Accordingly, both terminals of the first injector 210 and both terminals of the second injector 220 are short-circuited. From time t11 to time t12 in FIG. 7, interrupting current flows into the interrupting part 71, and the interrupting part 71 is melted. In this way, the injector driving device 110 stops energization not only to the first injector 210 but also to the second injector 220.

As described above, in the injector driving device 110, components required for stopping energization to each of the first injector 210 and the second injector 220 are commonly provided. For example, the short-circuiting MOS 61 and the interrupting part 71 are commonly provided for both of the first injector 210 and the second injector 220. Thus, in a case where only one of the first driving MOS 21 and the second driving MOS 22 has an on-failure, the injector deriving device 110 can stop energization to both of the first injector 210 and the second injector 220.

Thus, the injector driving device 110 can reduce the number of components compared with a case where the short-circuiting MOS 61 and the interrupting part 71 are provided for each of the first injector 210 and the second injector 220. Accordingly, the injector driving device 110 can achieve cost reduction.

The injector driving device 110 may control a plurality of load systems so as to enable evacuation traveling. Each of the load systems may include a plurality of injectors, such as the first injector 210 and the second injector 220.

In this case, the injector driving device 110 includes the first driving MOS 21 and the second driving MOS 22 for each of the load systems. There is a case where only one of the first driving MOS 21 and the second driving MOS 22 provided for one load system has an on-failure. However, the injector driving device 110 can stop energization to both of the first injector 210 and the second injector 220 in the case where only one of the first driving MOS 21 and the second driving MOS 22 has an on-failure. Thus, the injector driving device 110 does not adversely affect the evacuation traveling.

What is claimed is:

1. A load driving device comprising:
 a driving switching element driving a load by controlling energization to the load;
 an interrupting part disposed on an energizing path to the load, the interrupting part not melted by a driving current to the load, the interrupting part melted by an interrupting current larger than the driving current so as to interrupt energization to the load;
 a short-circuiting switching element disposed on a circuit branch parallel to the load and applying the interrupting current to the interrupting, part; and
 a backflow preventing diode disposed on the circuit branch parallel to the load, the backflow preventing diode protecting the short-circuiting switching element from a backflow of an electric current from the load to the short-circuiting switching element when the driving switching element is turned off, wherein
 the driving switching element, the interrupting part and the circuit branch on which the short-circuiting switching element and the backflow preventing diode are disposed form an interrupting path, and
 the interrupting current flows in the interrupting path.

2. The load driving device according to claim 1, further comprising
 a controller detecting an abnormal state of the energizing path and controlling the short-circuiting switching element based on a detection result, wherein
 when the controller detects that the energizing path is in the abnormal state, the controller controls the short-circuiting switching element to apply the interrupting current to the interrupting part.

3. The load driving device according to claim 2, wherein
 the controller monitors an energizing current of the driving switching element and determines whether a driving signal to the driving switching element is an off-signal, and
 when the controller determines that the driving signal is the off-signal and electric current flows into the driving switching element, the controller detects that the energizing path is in the abnormal state.

4. The load driving device according to claim 1, further comprising
 a plurality of backflow preventing diodes including the backflow preventing diode, wherein
 the load includes a plurality of injectors,
 the interrupting part is provided for each of the plurality of injectors,
 the short-circuiting switching element is provided for each of the plurality of injectors, and
 the plurality backflow preventing diodes are respectively provided for the plurality of injectors.

5. The load driving device according to claim 1, wherein
 a cathode of the backflow preventing diode is connected to the load, and an anode of the backflow preventing diode is connected to a source of the short-circuiting switching element to prevent the backflow of the current from the load to the short-circuiting switching element.

* * * * *